Patented Sept. 24, 1940

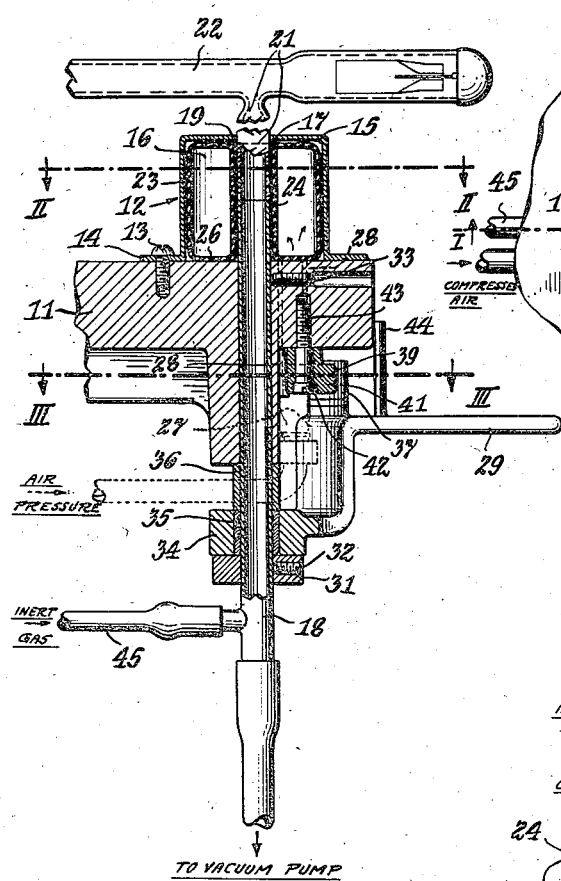
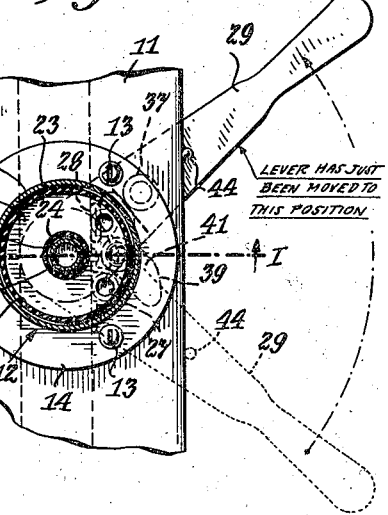
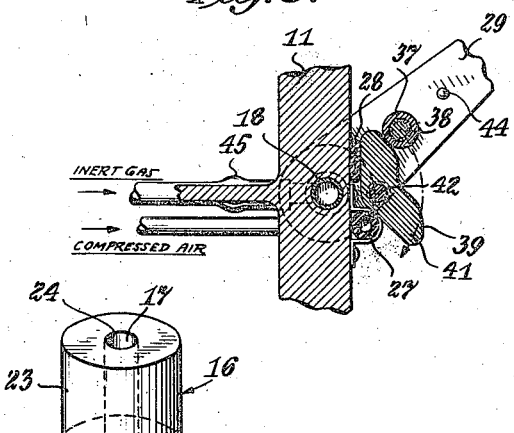
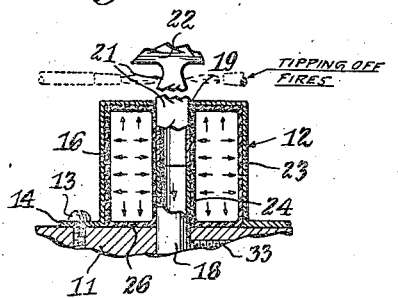

2,215,655

UNITED STATES PATENT OFFICE 2,215,655

MANUFACTURE OF VACUUM DEVICES

Nelson H. Stewart, Caldwell, N. J., assignor to Westinghouse Electric & Manufacturing Company, East Pittsburgh, Pa., a corporation of Pennsylvania Application June 9, 1938, Serial No. 212,856

1 Claim. (Cl. 176—3)

This invention relates to the manufacture of vacuum devices and, more particularly, to means for permitting the insertion of a tubulation in the connection to the vacuum pumps requiring less force than in the more conventional types.

The principal object of my invention, generally considered, is the provision of an inflatable annular member housed and associated with a tube connecting with a vacuum pump or pumps to provide an aperture freely receiving the exhaust tubes of devices to be evacuated when in normal condition, and, when inflated, tightly gripping said tubes to connect them with said pumps, and means for introducing and releasing inflating fluid with respect to said member.

Another object of my invention is the provision of a connector between vacuum pumps and hollow bodies to be exhausted, such as the bulbs of electrical devices including incandescent lamps and discharge tubes, said connector comprising a housing-enclosed inflatable annular rubber member, which in turn surrounds a tube connecting with said pumps, leaving an aperture receiving the exhaust tubes of devices to be evacuated, and means for introducing fluid to, and releasing it from, said rubber member, to grip associated exhaust tubes and hold them in vacuum-tight connection with respect to said pumps, whereby said vessels may be freely connected to the pumps, held in tight association therewith during exhaustion, and freely removed therefrom after tipping-off.

A further object of my invention is the provision of a retainer receiving a tube connecting with vacuum pumps, and an annular inflatable rubber member surrounding said tube and enclosed in said retainer, said retainer having an aperture aligned with said tube for receiving exhaust tubes of devices to be evacuated, and a handle operable to either introduce expanding fluid into said annular rubber member for gripping an exhaust tube and connecting it to said pumps, or releasing said fluid therefrom and allowing free insertion or withdrawal of said tube.

Other objects and advantages of the invention, relating to the particular arrangement and construction of various parts, will become apparent as the description proceeds.

Referring to the drawing illustrating my invention:

Fig. 1 is a partial elevational view, and partial vertical section on the line I—I of Fig. 2, in the direction of the arrows.

Fig. 2 is a horizontal sectional view on the line II—II of Fig. 1, in the direction of the arrows.

Fig. 3 is a fragmentary sectional view on the line III—III of Fig. 1, in the direction of the arrows.

Fig. 4 is a fragmentary view corresponding to Fig. 1, but showing the annular rubber member inflated and gripping the exhaust tube of a hollow body to be evacuated.

Fig. 5 is a detail perspective view of the annular rubber member removed from the associated apparatus.

Referring to the drawing in detail, like parts being designated by like reference characters, there is shown an exhaust table or spider 11 upon which is mounted a retainer 12, as by means of screws 13 passing through the lower flange 14 thereof, and into the top of said table. The retainer 12 is hollow and provides a generally cylindrical compartment 15 into which fits a hollow inflatable annular member or ring 16, desirably formed of soft rubber.

Extending upwardly from the table 11, entering the hole 17 in the inflatable rubber member 16, and preferably terminating about midway of the height of the retainer 12 and enclosed member 16, to provide an exhaust tube stop at the desired location, is an exhausting tube 18, also adapted to serve for the introduction of fill gas, which is desirably formed of metal, and of a diameter corresponding generally with that of exhaust tubes or tubulatures of devices to be evacuated, but preferably being of such a size as to snugly fit the hole 17. The retainer 12 has an aperture 19 in its upper wall, corresponding generally in size with the tube 18, for receiving exhaust tubes 21 of hollow devices 22, such as lamp bulbs, to be evacuated, with or without the subsequent introduction of inert gas. The aperture 19 is just large enough to permit the free insertion of such exhaust tubes, while insuring that the same are properly centered with respect to the inflatable rubber member 16.

The rubber element 16 is desirably constructed, as shown in detail in Fig. 5; that is, formed hollow by the provision of an outer cylindrical wall 23 spaced a relatively great distance from an inner cylindrical wall 24, leaving the relatively small aperture 17. The outer cylindrical wall 23 is normally of such a diameter that retainer 12 easily fits thereover, while the inner cylindrical wall 24 is of such a diameter that it normally permits the insertion of an exhaust tube 21, until it engages the upper end of the tube or pipe 18, without binding, but with little clearance. Depending from the lower annular wall 26 of the rubber member 16 are tubes, one of which, designated as 27, may serve for the introduction of compressed air or other inflating fluid, into the member 16 and the other, designated as 28, may serve for the release of said fluid. As an alternative, a three-way valve may be used with only one tube, and the other always kept closed or omitted, so that the rubber element 16 may be inflated or allowed to collapse and assume its normal size at will.

A lever 29 is provided for actuating the inflatable member 16 by introducing compressed air thereto, and releasing it therefrom. This lever is desirably pivotally mounted on the lower extension of the tube 18, as by being supported on an annular collar 31, held in place thereon as by means of a set screw 32. The tube 18 may be held in position with respect to the table 11 in any desired manner, as by means of a set screw 33. The hub 34 of the lever 29 is desirably bushed, as indicated at 35, and held in spaced relation with respect to the table 11, by means of a bushing 36 disposed on the tube 18.

The lever 29 carries a roller 37 pivotally mounted on an arbor 38 upstanding therefrom and engaging the outer cam surface 39 of a pinch clamp 41, mounted on a depending pivot member 42, secured to the lower surface of the table 11, as by threadably engaging the same, as indicated at 43, which, when in the position illustrated in full lines in Figs. 2 and 3, closes the exhaust tube 28 as by squeezing it against a depending portion of the table 11, and opens the air inlet tube 27, of the rubber member 16, permitting the entry of compressed air into said member, and causing inflation thereof with consequent gripping of the engaged end of the pipe 18 and corresponding end of an exhaust tube 21, which is presumably then in place, as shown in Fig. 1.

Although I do not wish to be limited to the exact figures, it might be stated that I have found that air pressure of about fifteen pounds per square inch may be satisfactorily employed, and the length of the bearing or surface engagement between the rubber element 16 and the exhaust tube 21, may be about one-half inch for making a vacuum-tight joint.

Upon moving the lever 29 from the full to the dotted line position, shown in Fig. 2, the roller 37 passes from the far segment and runs over the near segment of the curved surface 39 of the pinch clamp 41, closing the air inlet pipe 27, as by squeezing it against the adjacent surface of a depending portion of the table 11, and opening the exhaust pipe 28 to allow escape of compressed air, or other inflating fluid, from the rubber member 16, and stop the supply of said fluid. The contour of the cam is such that the lever 29 will tend to stay in either of its extreme positions illustrated in Fig. 2, with no tendency to move due to pressure of air on either of the tubes 27 and 28.

In order to prevent movement of the lever 29 beyond the extreme positions illustrated in Fig. 2, a stop 44 is provided which extends upwardly therefrom and engages the outer edge of the table 11 before excessive movement takes place.

From the foregoing disclosure of my apparatus, it will be apparent that I may use the same for exhausting hollow bodies, with or without gas filling, by taking the following steps:

First, with the lever 29 in the position, shown in dotted-line-position in Fig. 2, where the rubber vacuum sealing member 16 is deflated, the hollow body 22 to be evacuated is placed in the position illustrated in Fig. 1 with the exhaust tube 21 received in the central aperture 17 of the hollow rubber member 16 and aligned with the exhausting tube 18. By virtue of the collapsed condition of the rubber member 16, the exhaust tube 21 is freely insertable in the central aperture 17, until it engages the top of the tube 18.

The foregoing having been accomplished, the lever 29 is moved to the position shown in full lines in Fig. 2, whereupon the rubber member 16 is inflated, causing the outer walls 23 thereof to tightly bind the inner surfaces of the retainer 12, and the inner wall 24 to be squeezed tightly around the exhausting pipe 18 and the exhaust tube or tubulature 21 of the vessel 22. This effects a vacuum-tight connection between the vessel to be evacuated, the vacuum pumps, and the inert gas supply.

If it is desired to merely remove the air from the device 22, the vacuum pumps are allowed to operate until the vacuum has reached the desired condition, in a manner well known in the art, whereupon tipping off fires operate on the exhaust tube 21, above the place where it enters the aperture 19 in the retainer 12, until said device 22 has been sealed off and removed. The lever 29 is then moved to the dotted position shown in Fig. 2, collapsing the rubber member 16 to release the engaged end portion of the exhaust tube 21, whereupon the operator may remove said portion without difficulty, and apply the corresponding exhaust tube of another hollow member to be evacuated.

On the other hand, if it is desired to fill the member 22 with inert gas after evacuation, this is done by introduction through the tube 45, after the desired degree of vacuum has been obtained, in a manner well known in the art. After introduction of the desired amount of inert gas has been effected, the exhaust tube 21 is tipped off, as previously described.

From the foregoing disclosure it will be seen that I have provided a device permitting the insertion of a tubulation or exhaust tube into engagement with an exhausting or gas-filling tube, in the connection to the vacuum pumps, which device requires considerably less force than in the more conventional types in which a relatively tight fit is at all times required, making it necessary to use a lubricant to facilitate tubulation insertion. This is of particular value where vacuum tube design is such that the exhaust tube is relatively weak mechanically, and it greatly increases the ease of removal of the portion of the exhaust tube remaining after tipping off, thereby facilitating manufacturing operations as well as avoiding the possibility of breakage.

Although a preferred embodiment of my invention has been disclosed, it will be understood that modifications may be made within the spirit and scope of the appended claim.

I claim:

In apparatus for quickly connecting and disconnecting hollow bodies with respect to vacuum-producing means, a table, an inflatable hollow annular rubber member resting thereon, a retainer telescoping with said rubber member and secured to said table, said table being provided with an aperture, an exhausting tube extending upwardly through said aperture and with its upper end portion snugly embraced by said rubber member, said retainer having an aperture in its upper wall aligned with said table aperture for the reception of exhaust tubes of bodies to be evacuated, the upper end of said exhausting tube providing a stop for said exhaust tubes, said table also being further apertured, and said rubber member having tubular means extending therethrough, the lower end portion of said tubular means lying alongside a depending part of said table, and means pivoted on said exhausting tube and adapted to alternately release and compress said tubular means against said depending part.

NELSON H. STEWART.